(12) United States Patent
Lyu et al.

(10) Patent No.: US 11,215,452 B2
(45) Date of Patent: Jan. 4, 2022

(54) SIMULATION HUB AND VERIFICATION METHOD

(71) Applicant: CITIC Dicastal CO., LTD., Hebei (CN)

(72) Inventors: Jinqi Lyu, Qinhuangdao (CN); Zhigao Yin, Qinhuangdao (CN); Hanbao Sun, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 148 days.

(21) Appl. No.: 16/550,487

(22) Filed: Aug. 26, 2019

(65) Prior Publication Data
US 2020/0271443 A1   Aug. 27, 2020

(30) Foreign Application Priority Data
Feb. 27, 2019   (CN) .......................... 201910147159.9

(51) Int. Cl.
*G01B 21/26* (2006.01)

(52) U.S. Cl.
CPC .......... *G01B 21/26* (2013.01); *G01B 2210/12* (2013.01); *G01B 2210/30* (2013.01)

(58) Field of Classification Search
CPC ................ G01B 21/26; G01B 2210/30; G01B 2210/12; G01B 11/2408; G01B 5/0004; G01B 5/0025; G01M 17/013
USPC ............................................. 33/203.12, 600
See application file for complete search history.

(56) References Cited

U.S. PATENT DOCUMENTS

| | | | | |
|---|---|---|---|---|
| 5,974,878 A | * | 11/1999 | Newell | ...................... B23B 5/04 73/462 |
| 6,101,911 A | * | 8/2000 | Newell | ...................... B23B 5/04 82/112 |
| 10,495,539 B2 | * | 12/2019 | Lv | ........................... B25B 11/00 |
| 2004/0010916 A1 | * | 1/2004 | Mazur | ..................... B60B 27/00 29/894.3 |
| 2019/0033159 A1 | * | 1/2019 | Lv | .......................... G01M 1/16 |
| 2020/0271443 A1 | * | 8/2020 | Lyu | ...................... G01M 17/013 |
| 2020/0271444 A1 | * | 8/2020 | Lyu | ....................... G01B 5/0004 |
| 2020/0271536 A1 | * | 8/2020 | Lyu | .......................... G01M 1/04 |
| 2020/0271537 A1 | * | 8/2020 | Lyu | ......................... G01M 1/16 |

OTHER PUBLICATIONS

Sun Hanbao, Lv Jingi. Study on Calibration Methods for Aluminum Wheel Runout Tester. Engineering & Test, vol. 53. No. 4 Dec. 2013.

* cited by examiner

*Primary Examiner* — Yaritza Guadalupe-McCall
(74) *Attorney, Agent, or Firm* — Syncoda LLC; Feng Ma

(57) ABSTRACT

A simulation hub includes an end plate, a clamping portion and a measuring disc, in which the clamping portion and the measuring disc are both detachably fixed to the end plate; the clamping portion includes a first positioning hole for positioning and clamping, the first positioning hole is a cylindrical hole, and the cylindricity of the first positioning hole is smaller than a preset value; the outer circumference of the measuring disc includes at least a measuring cylindrical surface having a preset axial length and a bus parallel to an axis of the first positioning hole, and circular runout test values of the measuring cylindrical surface are preset first or second harmonic runout values; and the outer diameter of the measuring cylindrical surface is adapted to the inner diameter of the first positioning hole.

7 Claims, 8 Drawing Sheets

SIMULATION HUB AND VERIFICATION METHOD

CROSS-REFERENCE TO RELATED APPLICATIONS

The present application claims benefit of Chinese Application No. 201910147159.9, filed on Feb. 27, 2019, the contents of which are hereby incorporated by reference in its entirety.

BACKGROUND

The motor vehicle hub (hereinafter referred to as the hub) is deformed during machining and heat treatment to cause a deviation in the shape of the hub. One of the common deviations is certain eccentric distance between the axis of rotation of the hub and the axis of the outer circumference of the hub. After the hub has the eccentric distance deviation, the outer circumference of the hub has a maximum runout value (peak value) and a minimum runout value (trough value) in one rotating circumference. Such circular runout having a peak value and a trough value in one rotating circumference is referred to as first harmonic runout in engineering, and the quality of the hub is evaluated based on this. If a motor vehicle is mounted with the hubs having too large first harmonic runout, the motor vehicle may bump or swing during driving, which is not safe and comfortable for a user. Thus, runout tests are required for ordinary hub products, and hub manufacturers are also equipped with motor vehicle hub runout testers special for testing motor vehicle hub runout.

The motor vehicle hub runout testers include contact and non-contact ones according to the test methods. The contact test principle indicates that a measuring component is used to be in contact with an inner or outer bead seat of a tested hub, and when the hub rotates, the runout of the inner or outer bead seat is transmitted to a displacement sensor through the measuring component, thereby realizing a hub runout test. The non-contact runout tester uses laser as a test source, the laser is directly projected onto an inner or outer bead seat of a tested hub, and the reflected light is tested to calculate the amount of runout when the hub rotates.

However, since all the hubs need to be tested, the test amount is relatively large. Either type of motor vehicle hub tester is gradually worn during use to lose the test accuracy. Accordingly, a standard hub (i.e., a defective product) having determined first harmonic runout values is required for verifying the accuracy and stability of first harmonic runout of the runout tester to ensure that the test data of the runout tester is accurate and reliable. At the same time, when test comparison is required for different hub runout testers, a standard hub having determined first harmonic runout values is also required to complete the comparison of first harmonic runout test results between different devices.

However, the verification directly using the real hub has the following problems:

1) Ordinary hubs are produced in mass with relatively stable quality, and it is difficult to find a hub having determined first harmonic runout values that are relatively large;

2) After the standard hub made of an ordinary hub is tested multiple times on the runout tester, the first harmonic runout value is easily changed due to wear, resulting in inaccurate verification;

3) The standard hub made of the ordinary hub is easily confused with the ordinary hub and flows into next procedure after verification, resulting in the loss of the standard hub and the introduction of defective products into the next procedure.

SUMMARY

The present disclosure relates to a motor vehicle wheel manufacturing technology, in particular to a simulation hub and a verification method.

In view of this, the present disclosure is directed to provide a simulation hub, which can verify a runout tester more accurately, has a simple structure and a long service life, and is not confused with an ordinary motor vehicle hub.

In order to achieve the above objective, the technical solution of the present disclosure is implemented as follows:

A simulation hub, including an end plate, a clamping portion and a measuring disc, in which the clamping portion and the measuring disc are both detachably fixed to the end plate; the clamping portion includes a first positioning hole for positioning and clamping, the first positioning hole is a cylindrical hole, and the cylindricity of the first positioning hole is smaller than a preset value; the outer circumference of the measuring disc includes at least a measuring cylindrical surface having a preset axial length and a bus parallel to an axis of the first positioning hole, and circular runout test values of the measuring cylindrical surface are all preset first or second harmonic runout values; and the outer diameter of the measuring cylindrical surface is adapted to the inner diameter of the first positioning hole.

In the above solution, the outer circumference of the measuring disc includes a measuring cylindrical surface, and circular runout test values of the measuring cylindrical surface are all preset first harmonic runout values; and the radial distance between the axis of the measuring cylindrical surface and the axis of the first positioning hole is greater than a preset value.

In the above solution, the numbers of the clamping portion and the measuring disc are respectively at least two, and the inner diameters of the first positioning holes of the clamping portions are different, and are set to gradually increase from small to large; and the outer diameters of the measuring cylindrical surfaces of the measuring disc are set to gradually increase from small to large, and are adapted to the inner diameters of the first positioning holes.

In the above solution, the clamping portion further includes a boss assembled with the end plate, the end plate includes a second positioning hole matching the boss, and after the boss is mounted into the second positioning hole, the parallelism between the axis of the second positioning hole and the axis of the first positioning hole is smaller than a preset value.

In the above solution, the measuring disc further includes a measuring vertical surface which is arranged on the outer side of the measuring cylindrical surface and is at angle of 80 to 90 degrees with the measuring cylindrical surface.

In the above solution, the clamping portion further includes an end face positioning surface, the end face positioning surface is at one end of the clamping portion, and a preset angle is formed between the end face positioning surface and the vertical plane of the axis of the first positioning hole.

In the above solution, the measuring disc is further provided with at least two third positioning holes and at least two first connecting holes, the end plate further includes fourth positioning holes and second connecting holes, with the positions of fourth positioning holes and second connecting holes matching the third positioning holes and the first connecting holes, and the measuring disc and the end plate are fixed as follows: positioning pins are respectively inserted into the third positioning holes and the fourth positioning holes for positioning, and then bolts pass through the first connecting holes and the second connecting holes and screwed to nuts for fixing.

In the above solution, the end plate is provided with at least two lightening holes uniformly distributed along the circumference, and the radial distances between the lightening holes and the measuring cylindrical surface are greater than a preset value.

The present disclosure also provides a using method of simulation hubs, including:

clamping a first simulation hub meeting a preset requirement to a first runout tester, measuring circular runout and processing data to obtain first data;

clamping a second simulation hub meeting a preset requirement to the first runout tester, and measuring circular runout and processing data to obtain second data; in which the difference between the sizes of measuring discs of the first simulation hub and the second simulation hub is greater than a preset value; and determining that the measurement accuracy of the first runout tester meets a preset requirement when the first data and the second data meet the preset requirement; otherwise, determining that the measurement accuracy of the first runout tester does not meet the preset requirement.

In the above solution, clamping a first simulation hub meeting a preset requirement to a first runout tester, measuring circular runout and processing data to obtain first data includes:

clamping the first simulation hub meeting the preset requirement to the first runout tester, and measuring circular runout of preset portions of the first simulation hub in a radial direction and an axial direction, where at least 64 points are measured in each direction; then repeating the clamping at least three times, and testing at each clamping to obtain first circular runout values;

performing Fourier transform on the first circular runout values to obtain second circular runout values after clamping errors are removed from the first simulation hub; and performing preset statistical processing on the second circular runout values to obtain first data of fluctuation of the circular runout values of the first simulation hub in the radial direction and the axial direction;

clamping a second simulation hub meeting a preset requirement to the first runout tester, measuring circular runout and processing data to obtain second data includes:

clamping the second simulation hub meeting the preset requirement to the first runout tester, and measuring circular runout of preset portions of the second simulation hub in a radial direction and an axial direction, where at least 64 points are measured in each direction; then repeating the clamping at least three times, and testing at each clamping to obtain third circular runout values;

performing Fourier transform on the third circular runout values to obtain four circular runout values after clamping errors are removed from the second simulation hub; and performing preset statistical processing on the fourth circular runout values to obtain second data of fluctuation of the circular runout values of the second simulation hub in the radial direction and the axial direction.

The simulation hub according to the embodiments of the present disclosure includes an end plate, a clamping portion and a measuring disc, in which the clamping portion and the measuring disc are both detachably fixed to the end plate; the clamping portion includes a first positioning hole for positioning and clamping, the first positioning hole is a cylindrical hole, and the cylindricity of the first positioning hole is smaller than a preset value; the outer circumference of the measuring disc includes at least a measuring cylindrical surface having a preset axial length and a bus parallel to an axis of the first positioning hole, and circular runout test values of the measuring cylindrical surface are preset first or second harmonic runout values; and the outer diameter of the measuring cylindrical surface is adapted to the inner diameter of the first positioning hole. Hence, the simulation hub according to the embodiments of the present disclosure can verify a runout tester more accurately, has a simple structure and a long service life, and is not confused with an ordinary motor vehicle hub.

Other advantageous effects of the embodiments of the present disclosure will be further described in conjunction with specific technical solutions in the specific embodiments.

DETAILED DESCRIPTION

Figure 1:
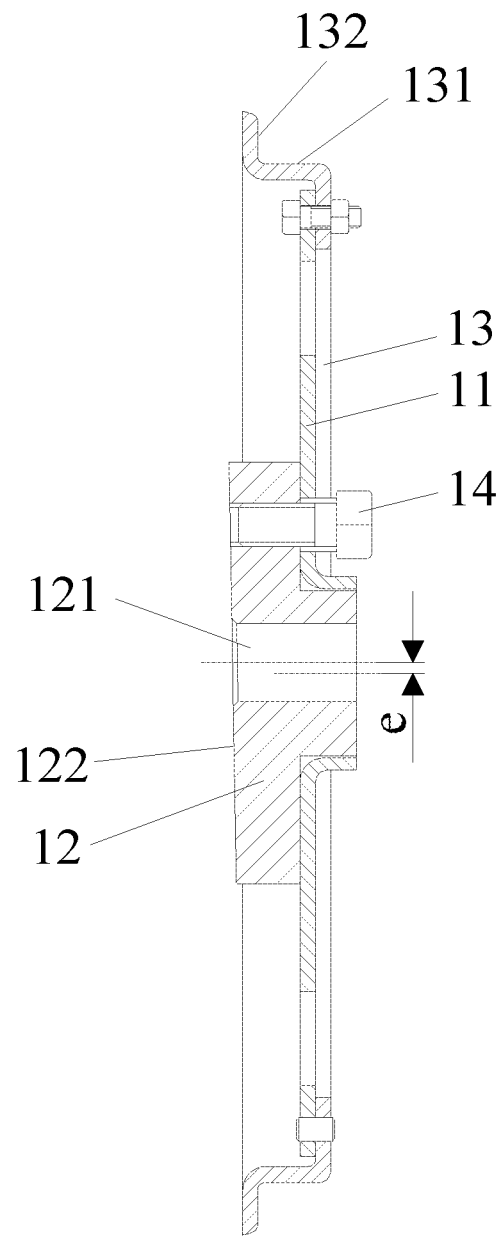
FIG. 1 is a cross-sectional schematic diagram of a simulation hub according to Embodiment 1 of the present disclosure.

It should be noted that, the terms "first/second/third" involved in the embodiments of the present disclosure are only intended to distinguish similar objects, but do not represent specific orders of the objects, and understandably, the "first\second\third" may be interchanged in a specific order or consecutive. Embodiments of the present disclosure provide a simulation hub, including an end plate, a clamping portion and a measuring disc, in which the clamping portion and the measuring disc are both detachably fixed to the end plate; the clamping portion includes a first positioning hole for positioning and clamping, the first positioning hole is a cylindrical hole, and the cylindricity of the first positioning hole is smaller than a preset value; the outer circumference of the measuring disc includes at least a measuring cylindrical surface having a preset axial length and a bus parallel to an axis of the first positioning hole, and circular runout test values of the measuring cylindrical surface are preset first or second harmonic runout values; and the outer diameter of the measuring cylindrical surface is adapted to the inner diameter of the first positioning hole.

The measuring cylindrical surface is a surface for measuring circular runout; the simulation hub is fixed to a motor vehicle hub runout tester through the first positioning hole, the motor vehicle hub runout tester is provided with a clamp including an expansion column, and the expansion column is inserted into the first positioning hole and then expands to clamp the simulation hub.

The cylindricity of the first positioning hole is smaller than a preset value, so that the positioning is more accurate; the axial length of the measuring cylindrical surface is preset to facilitate the contact with a measuring head for measuring the circular runout; the circular runout test values of the measuring cylindrical surface are all preset first or second harmonic runout values, that is, the simulation hub is a defective product. When the circular runout test values of the measuring cylindrical surface are preset first harmonic runout values, the defective product is caused by the reason that the axis of the measuring cylindrical surface is inconsistent with the axis of rotation of the measuring cylindrical surface, where the axis of rotation is determined by the axis of the first positioning hole, so the axis of the measuring cylindrical surface is inconsistent with the axis of the first positioning hole, that is, the simulation hub simulates a defective hub of which the axis of the outer circumference is not coaxial with the axis of rotation; when the circular runout test values of the measuring cylindrical surface are preset second harmonic runout values, the defective product is caused by the reason that the outer circumference of the measuring disc is elliptical. This defective hub assigned with determined values can verify the motor vehicle hub run tester.

The clamping portion and the measuring disc of the simulation hub according to the embodiments of the present disclosure are both detachably fixed to the end plate. In this way, when the clamping portion or the measuring disc is damaged, only the damaged clamping portion or measuring disc is replaced, thereby prolonging the service life of the simulation hub and reducing the test cost of an enterprise.

Preferably, in the embodiments of the present disclosure, the numbers of the clamping portion and the measuring disc may also be respectively set to at least two. The inner diameters of the first positioning holes of the clamping portions are different, and are set to increase from small to large, for example, 15 inches, 18 inches, 20 inches, 22 inches, 24 inches, etc. The outer diameters of the measuring cylindrical surfaces of the measuring discs are set to gradually increase from small to large, for example, 50 mm, 60 mm, 70 mm, 80 mm, 90 mm, etc., and are all adapted to the inner diameters of the first positioning holes. In this way, hubs of different sizes can be simulated by the combination of the measuring discs and the clamping portions, so that the runout tester can be verified on multiple levels, and the accuracy of verification is improved. For example, a measuring disc with a measuring cylindrical surface having an outer diameter of 50 mm and a clamping portion with a first positioning hole having an inner diameter of 15 inches are correspondingly fixed to the end plate to simulate a small hub, or a measuring disc with a measuring cylindrical surface having an outer diameter of 70 mm and a clamping portion with a first positioning hole having an inner diameter of 20 inches are correspondingly fixed to the end plate to simulate a medium hub.

The embodiments of the present disclosure also provide a using method of simulation hubs, including:

clamping a first simulation hub meeting a preset requirement to a first runout tester, measuring circular runout and processing data to obtain first data;

clamping a second simulation hub meeting a preset requirement to the first runout tester, and measuring circular runout and processing data to obtain second data; in which the difference between the sizes of measuring discs of the first simulation hub and the second simulation hub is greater than a preset value; and determining that the measurement accuracy of the first runout tester meets a preset requirement when the first data and the second data meet the preset requirement; otherwise, determining that the measurement accuracy of the first runout tester does not meet the preset requirement.

Here, the first runout tester is a runout tester with unknown measurement accuracy, and the first data and the second data meeting the preset requirement indicates that the fluctuation of circular runout of the simulation hub tested by the runout tester with unknown measurement accuracy conforms to the actual fluctuation of circular runout of the simulation hub.

In an embodiment, clamping a first simulation hub meeting a preset requirement to a first runout tester, measuring circular runout and processing data to obtain first data includes:

clamping the first simulation hub meeting the preset requirement to the first runout tester, and measuring circular runout of preset portions of the first simulation hub in a radial direction and an axial direction, where at least 64 points are measured in each direction; then repeating the clamping at least three times, and testing at each clamping to obtain first circular runout values;

performing Fourier transform on the first circular runout values to obtain second circular runout values after clamping errors are removed from the first simulation hub; and performing preset statistical processing on the second circular runout values to obtain first data of fluctuation of the circular runout values of the first simulation hub in the radial direction and the axial direction;

clamping a second simulation hub meeting a preset requirement to the first runout tester, measuring circular runout and processing data to obtain second data includes:

clamping the second simulation hub meeting the preset requirement to the first runout tester, and measuring circular runout of preset portions of the second simulation hub in a radial direction and an axial direction, where at least 64 points are measured in each direction; then repeating the clamping at least three times, and testing at each clamping to obtain third circular runout values;

performing Fourier transform on the third circular runout values to obtain four circular runout values after clamping errors are removed from the second simulation hub; and performing preset statistical processing on the fourth circular runout values to obtain second data of fluctuation of the circular runout values of the second simulation hub in the radial direction and the axial direction.

Here, the preset portions may be the measuring cylindrical surface and the measuring vertical surface, that is, the circular runout of the simulation hub in both the radial direction and the axial direction may be simultaneously tested; at least 64 points measured in each direction are required for the calculation of a Fourier function, where the number of points is the N-th power of 2; the number of points may be 64 or 128 for rough measurement, 512 for strict measurement, and 1024 or 2048 for stricter measurement. At least three times of clamping are repeated to avoid errors in the test, e.g., dust on the measuring heads, etc. The more times the test is, the more accurate the data are.

Here, before clamped to the first runout tester, whether the first simulation hub and the second simulation hub meet the preset requirements need to be tested by the runout tester with known measurement accuracy, the preset requirement indicates that the fluctuation of circular runout of the simulation hub meets the preset requirement, specifically, the circular runout test values of the measuring cylindrical surfaces and the measuring vertical surfaces of the first simulation hub and the second simulation hub are preset first or second harmonic runout values, i.e., the simulation hubs are typical defective products.

Here, the preset statistical processing is to calculate a standard deviation and the like for the obtained circular runout data, and a sine curve is drawn accordingly.

In the embodiment of the present disclosure, the first simulation hub and the second simulation hub, which meet the preset requirements and have measuring discs of different sizes, are used to jointly verify the accuracy of the first runout tester with unknown accuracy, so that the verification result is more accurate. It can be understood that this embodiment is a preferred one, and it is also available to verify with only one simulation hub or with more than two simulation hubs.

The present disclosure will be described in detail below with reference to the accompanying drawings and specific embodiments. It should be understood that the specific embodiments described herein are merely used for interpreting the present disclosure, rather than limiting the present disclosure.

Embodiment 1

Figure 2:
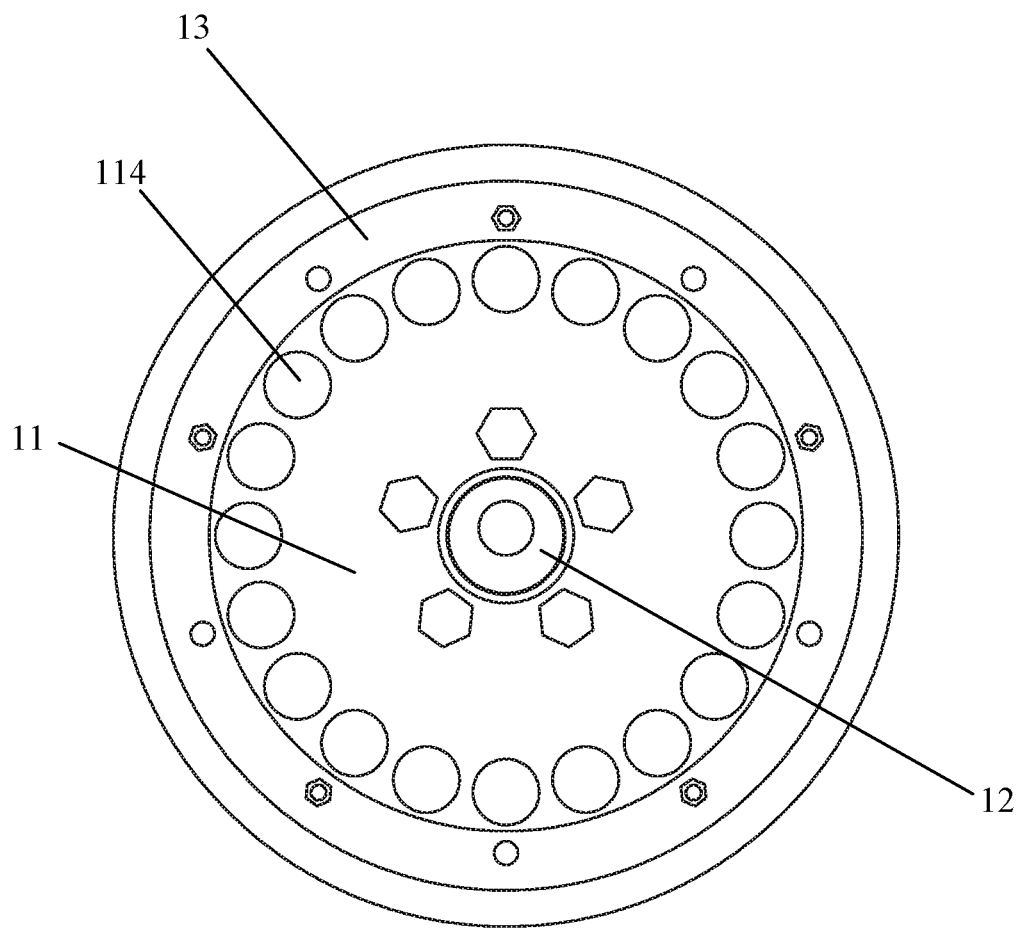
FIG. 2 is a right-side view of the simulation hub according to Embodiment 1 of the present disclosure.
Figure 3:
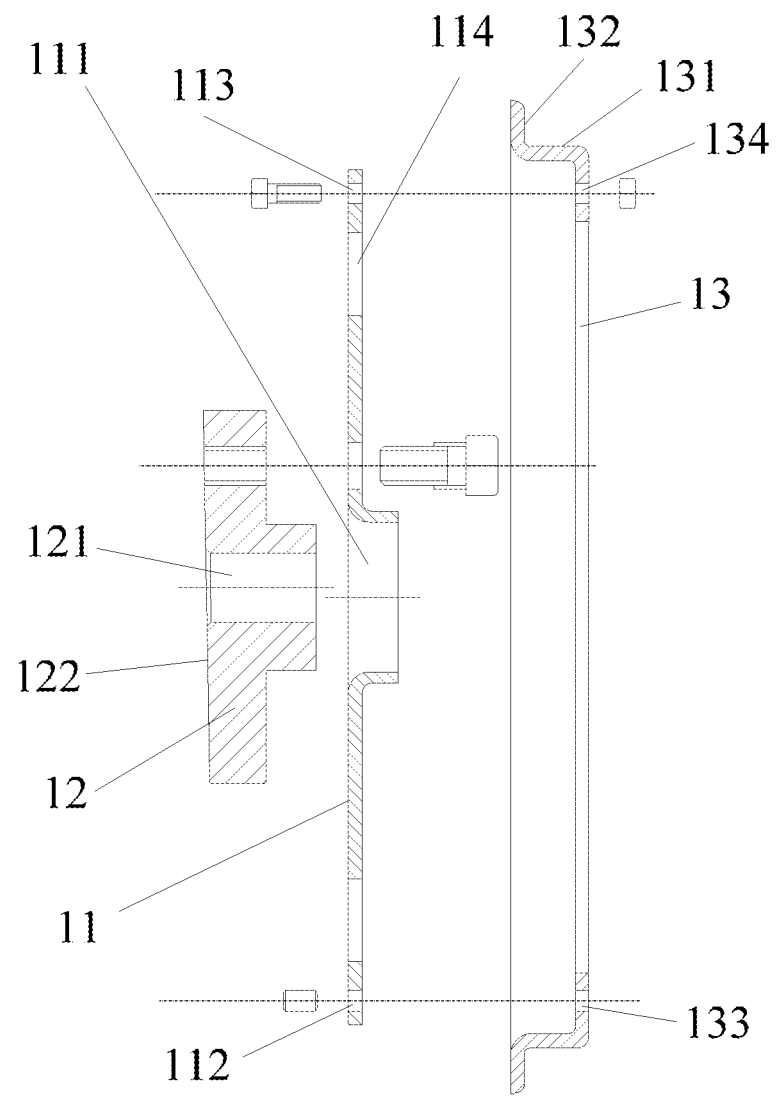
FIG. 3 is an exploded schematic diagram of the simulation hub according to Embodiment 1 of the present disclosure.

FIG. 1 is a schematic diagram of a simulation hub according to Embodiment 1 of the present disclosure, FIG. 2 is right-sight view of the simulation hub according to Embodiment 1, and FIG. 3 is an exploded schematic diagram of the simulation hub according to Embodiment 1. As shown in FIGS. 1-3, the simulation hub includes an end plate 11, a clamping portion 12 and a measuring disc 13, in which the clamping portion 12 and the measuring disc 13 are both detachably fixed to the end plate 11; the clamping portion 12 includes a first positioning hole 121 for positioning and clamping, and the first positioning hole 121 is used for matching a clamp of a motor vehicle hub runout tester; the first positioning hole 121 is a cylindrical hole, and the cylindricity of the first positioning hole 121 is smaller than a preset value to achieve accurate positioning; the outer circumference of the measuring disc 13 includes at least a measuring cylindrical surface 131 having a preset axial length and a bus parallel to an axis of the first positioning hole 121; and the outer diameter of the measuring cylindrical surface 131 is adapted to the inner diameter of the first positioning hole 121. The radial distance between the axis of the measuring cylindrical surface 131 and the axis of the first positioning hole 121 is e. Circular runout test values of the measuring cylindrical surface 131 are all preset first harmonic runout values, that is, the measuring cylindrical surface 131 is a surface for measuring circular runout, the simulation hub is a defective product, which is caused by the reason that the axis of the measuring cylindrical surface 131 is inconsistent with the axis of rotation of the measuring cylindrical surface 131 (because the axis of rotation is determined by the axis of the first positioning hole 121), that is, the simulation hub simulates a defective hub of which the axis of the outer circumference is not coaxial with the axis of rotation, so that the motor vehicle hub runout tester can be verified.

Here, the value of e must be greater than a preset value. The preset value is to ensure a large enough difference between a peak value and a trough value of radial runout of the simulation hub in a rotating circumference, so that the radial circular runout test values of the simulation hub are preset first harmonic runout values to achieve the purpose of verifying the runout tester. In this embodiment, the value of e is preferably 1 to 2 mm.

In this embodiment, the clamping portion 12 further includes a boss 123 assembled with the end plate 11, the end plate 11 includes a second positioning hole 111 matching the boss 123, and after the boss 123 is mounted into the second positioning hole 111, the parallelism between the bus of the measuring cylindrical surface 131 and the axis of the first positioning hole 121 is smaller than a preset value, which puts forward requirements for the sizes, shapes and positions of the boss 123 and the second positioning hole 111. In this way, the clamping portion 12 and the end plate 11 are assembled more easily, and are positioned more accurately.

In this embodiment, the outer side of the measuring cylindrical surface 131 is provided with a measuring vertical surface 132, and the angle between the measuring vertical surface 132 and the measuring cylindrical surface 131 is 80 to 90 degrees, which facilitates simultaneous placement of a radial measuring head for measuring radial circular runout and an axial measuring head for measuring axial circular runout, and improves the accuracy of test positioning. Thus, the axial circular runout can also be measured besides the radial circular runout, where the radial circular runout is radial circular runout of the measuring cylindrical surface 131, and the axial circular runout is axial circular runout of the measuring vertical surface 132.

Figure 4:
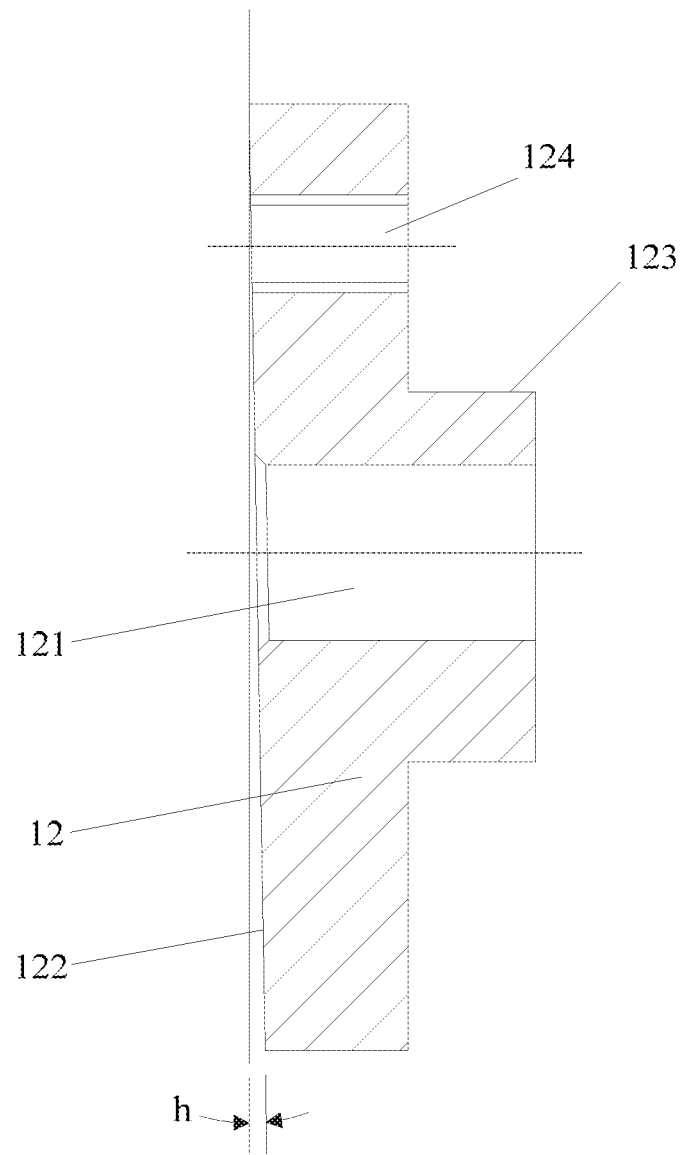
FIG. 4 is a schematic diagram of a clamping portion of the simulation hub according to Embodiment 1 of the present disclosure.

In this embodiment, as shown in FIG. 4, the clamping portion 12 further includes an end face positioning surface 122 matching the runout tester, the end face positioning surface 122 is at one end of the clamping portion 12, and an angle h is formed between the end face positioning surface 122 and the vertical plane of the axis of the first positioning hole 121. The end face positioning surface 122 is used for positioning the simulation hub. In the presence of h, the mounting position of the simulation hub is inaccurate, that is, the axial circular runout test values of the simulation hub are preset first harmonic runout values. In addition, the value of h also needs to be large enough to ensure that the axial runout of the simulation hub, i.e., the circular runout of the measuring vertical surface has a large enough difference between the peak value and the trough value in one rotating circumference, thereby achieving the purpose of verifying the runout tester. In this embodiment, the value of h may be 2 to 5 degrees.

In this embodiment, the clamping portion 12 further includes at least two threaded holes 124, the axes of the threaded holes 124 are parallel to the axis of the first positioning hole 121, and the end plate 11 further includes screw through holes, with the positions of the screw through holes matching the threaded holes 124; the clamping portion 12 and the end plate 11 are fixed as follows: after the boss 123 is assembled with the second positioning hole 111, screws 14 are inserted into the screw through holes and screwed into the threaded holes 124 for fixing. This is simple to fix and easy to assemble and disassemble. The numbers of the threaded holes 124 and the screw through holes in this embodiment are preferably five.

In this embodiment, the measuring disc 13 is further provided with at least two third positioning holes 133 and at least two first connecting holes 134, the end plate 11 further includes fourth positioning holes 112 and second connecting holes 113, with the positions of fourth positioning holes 112 and second connecting holes 113 matching the third positioning holes 133 and the first connecting holes 134, and the measuring disc 13 and the end plate 11 are fixed as follows: positioning pins are respectively inserted into the third positioning holes 133 and the fourth positioning holes 112 for positioning, and then bolts are inserted into the first connecting holes 134 and the second connecting holes 113 and screwed to nuts for fixing. The positioning pins play a role in positioning and also limit the circumferential rotation of the measuring disc 13 relative to the end plate 11. By fixing with bolts and nuts, the axial movement of the measuring disc 13 relative to the end plate 11 is limited, and it is then avoided that the simulation hub does not meet the preset requirement due to the mounting of the measuring disc 13 and the end plate 11. Preferably, in this embodiment, the numbers of the third positioning holes 133, the fourth positioning holes 112, the first connecting holes 134, and the second connecting holes 113 are respectively five, and the positioning holes and the connecting holes are spaced and uniformly arranged, but the present disclosure is not limited thereto.

In this embodiment, the end plate 11 is provided with at least two lightening holes 114 uniformly distributed along the circumference, and the radial distances between the lightening holes 114 and the measuring cylindrical surface 131 are greater than a preset value to ensure the strength of the simulation hub. In this way, it can be prevented that the simulation hub is too heavy so as to increase the load of the motor vehicle hub runout tester, the too heavy simulation hub easily causes the clamp to loosen and deviate, and the heat dissipation is facilitated. The number of the lightening holes 112b in this embodiment is preferably 20.

Embodiment 2

Figure 5:
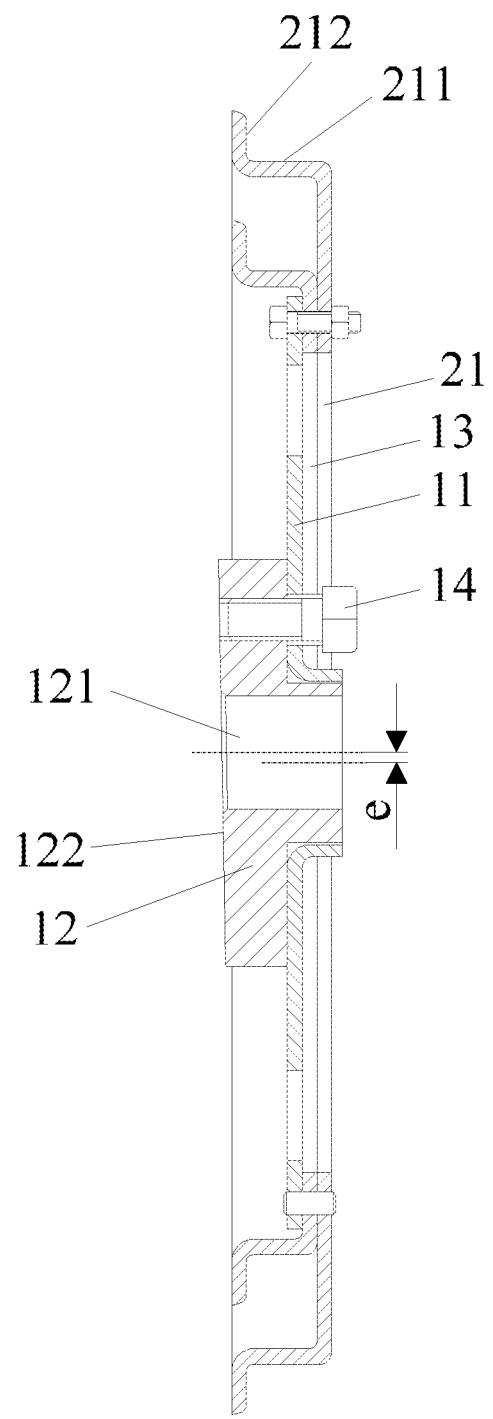
FIG. 5 is a cross-sectional schematic diagram of a simulation hub according to Embodiment 2 of the present disclosure.
Figure 6:
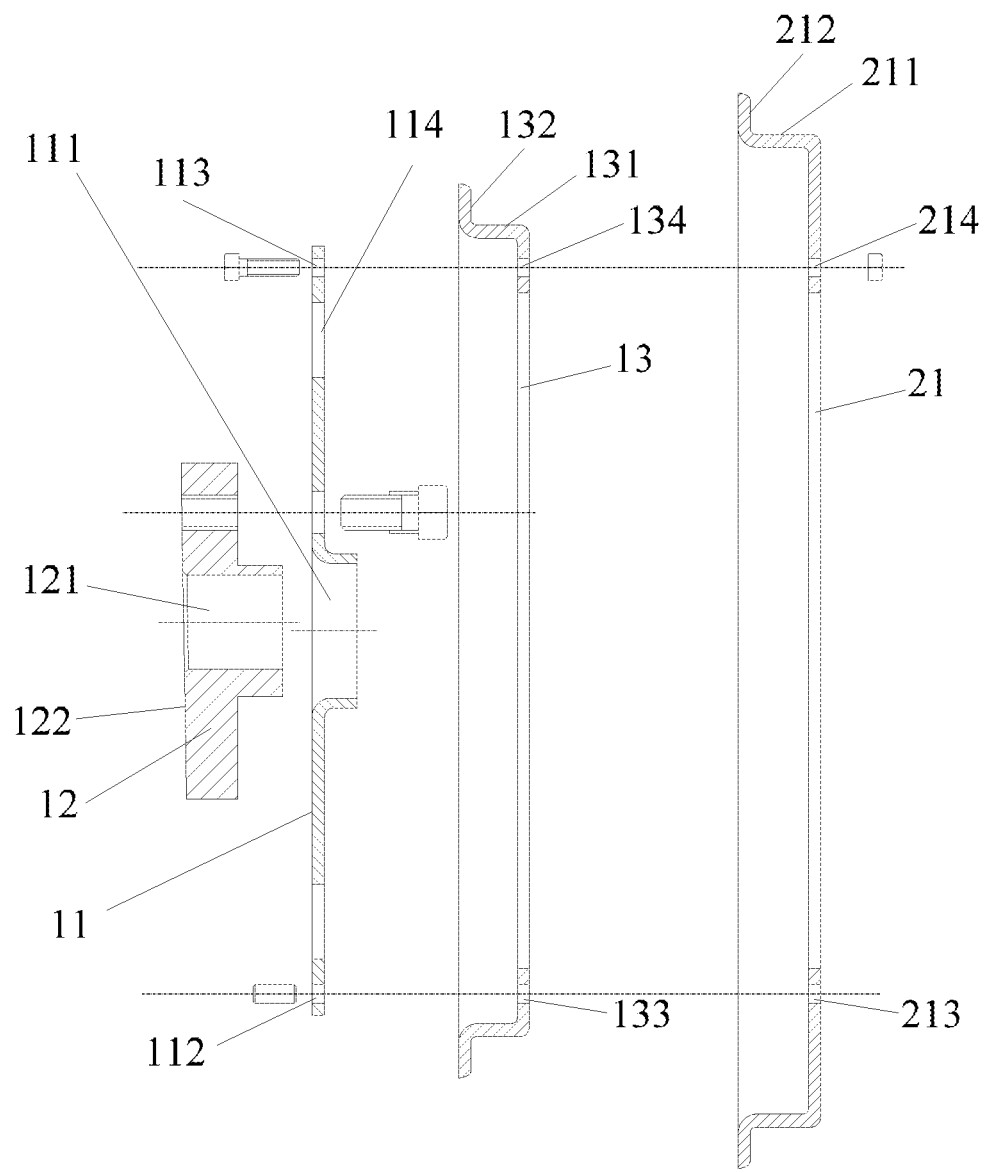
FIG. 6 is an exploded schematic diagram of the simulation hub according to Embodiment 2 of the present disclosure.

As shown in FIG. 5 and FIG. 6, the simulation hub of this embodiment differs from that of Embodiment 1 in that the simulation hub of this embodiment further includes a second measuring disc 21.

The outer circumference of the second measuring disc 21 includes at least one second measuring cylindrical surface 211 having a preset axial length and a bus parallel to an axis of the first positioning hole 121, circular runout test values of the second measuring cylindrical surface 211 are all preset first harmonic runout values, and the diameter of the second measuring cylindrical surface 211 is larger than the diameter of the measuring cylindrical surface 131.

The outer side of the second measuring cylindrical surface 211 is provided with a second measuring vertical surface 212, and the angle between the second measuring vertical surface 212 and the second measuring cylindrical surface 211 is 80 to 90 degrees, so that both of radial circular runout and axial circular runout can be measured.

The second measuring disc 21 is further provided with fifth positioning holes 213 and third connecting holes 214, with the positions of fifth positioning holes 213 and third connecting holes 214 matching the third positioning holes 133 and the first connecting holes 134. The measuring disc 13, the second measuring disc 21, and the end plate 11 are fixed as follows: positioning pins are respectively inserted into the fifth positioning holes, the third positioning holes 133 and the fourth positioning holes 112 for positioning, and then bolts are inserted into the third connecting holes 214, the first connecting holes 134 and the second connecting holes 113 and screwed to nuts for fixing.

This embodiment not only has the advantages of Embodiment 1, but also has the advantages that the runout tester may be tested with hubs of multiple sizes by disassembling and assembling the second measuring disc 21 without removing the simulation hub of this embodiment from the runout tester, which facilitates the inspection.

Embodiment 3

Figure 7:
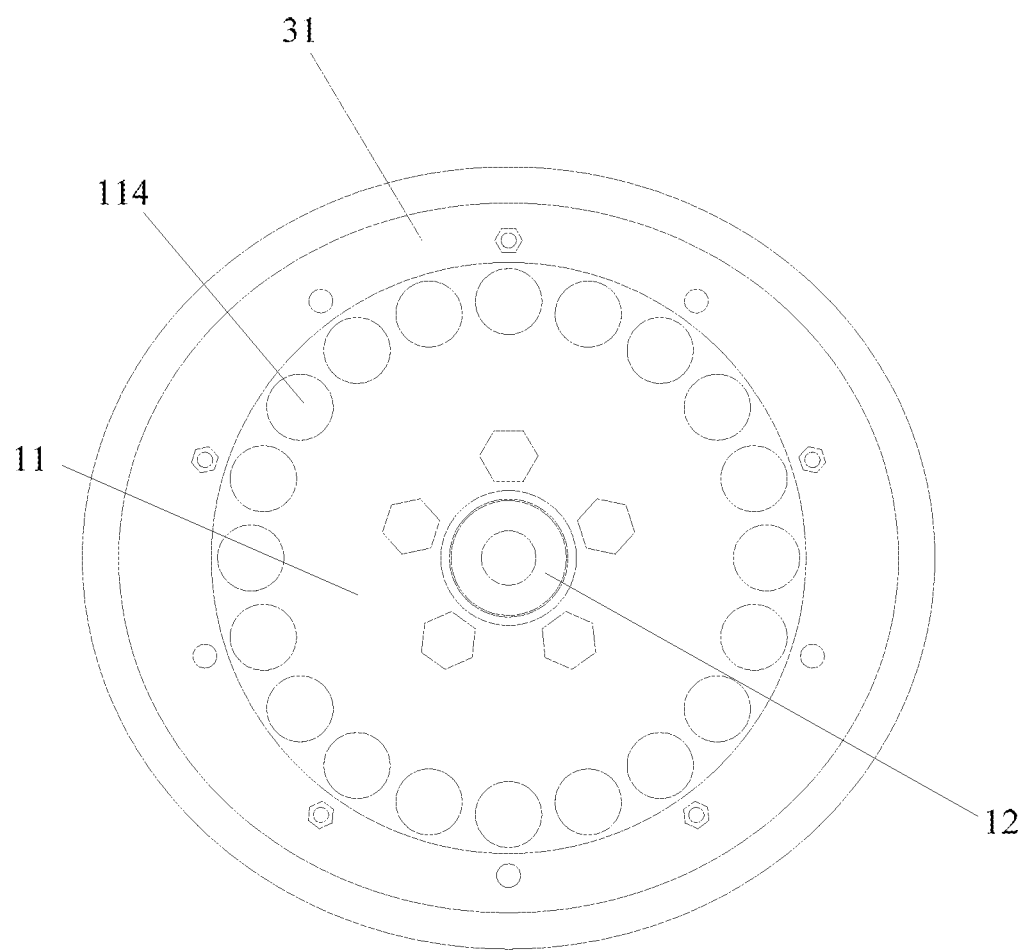
FIG. 7 is a schematic diagram of a simulation hub according to Embodiment 3 of the present disclosure.

As shown in FIG. 7, this embodiment differs from Embodiment 1 in that a third measuring disc 31 is included in this embodiment instead of the measuring disc 13 in Embodiment 1, the third measuring disc 31 includes at least a third measuring cylindrical surface 311 having a preset axial length and a bus parallel to an axis of the first positioning hole 121, the axis of rotation of the third measuring cylindrical surface 311 coincides with the axis of the first positioning hole 121, the third measuring cylindrical surface 311 is an elliptical surface, and circular runout test values of the third measuring cylindrical surface 311 are all preset second harmonic runout values, that is, the simulation hub of this embodiment has two peak values and two trough values in one circle of rotation.

The simulation hub of this embodiment can be used to verify a runout tester through the tested second harmonic values.

Embodiment 4

Figure 8:
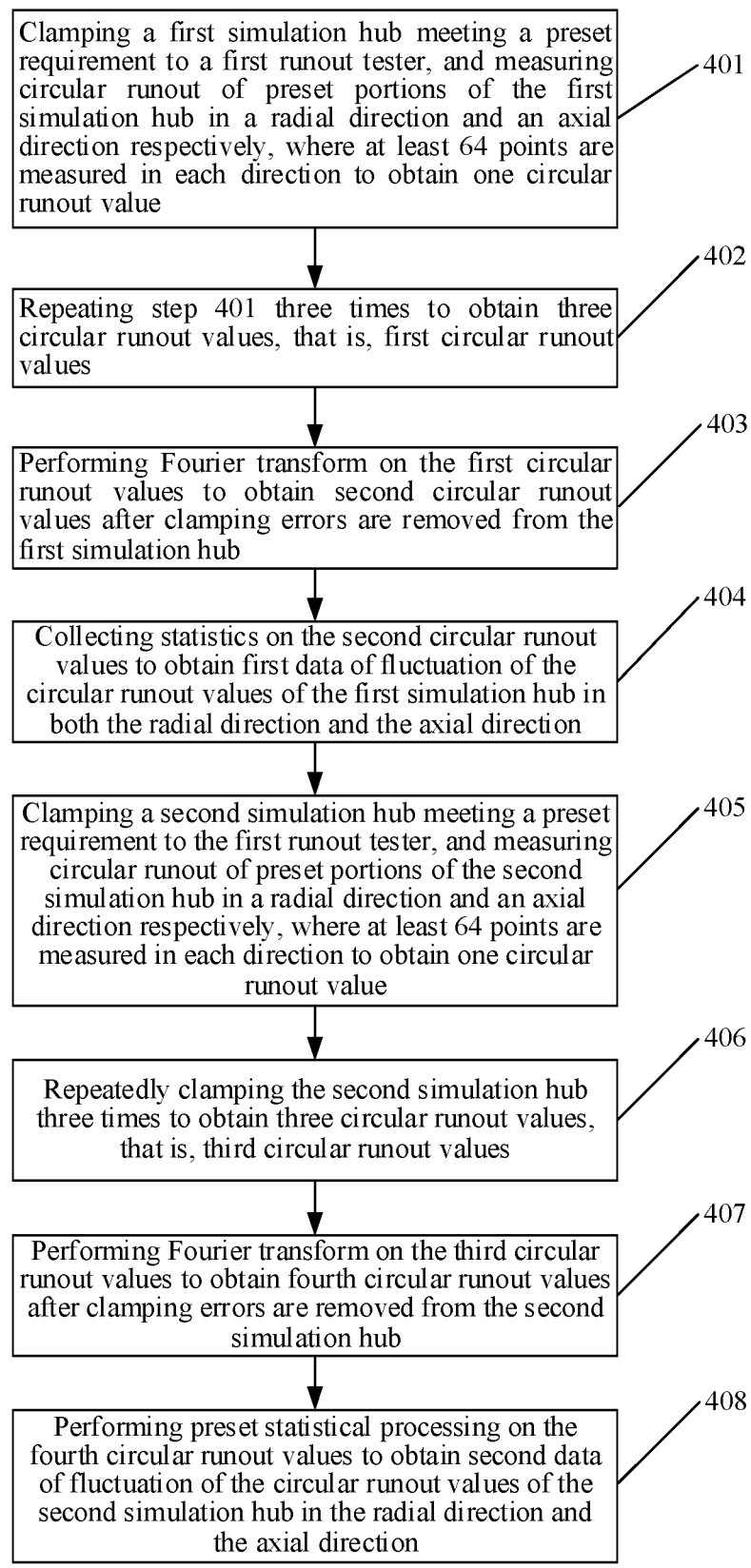
FIG. 8 is a flowchart of a using method of the simulation hub according to Embodiment 4 of the present disclosure.

FIG. 8 is a schematic flowchart of a using method of the simulation hub according to Embodiment 4 of the present disclosure. As shown in FIG. 8, the method includes the following steps:

In step 401, a first simulation hub meeting a preset requirement is clamped to a first runout tester, and circular runout of preset portions of the first simulation hub in a radial direction and an axial direction is measured respectively, where at least 64 points are measured in each direction to obtain one circular runout value; the preset portions here are the measuring cylindrical surface and the measuring vertical surface;

In step 402, step 401 is repeated three times to obtain three circular runout values, that is, first circular runout values; because of many measurement points and multiple tests, more accurate test data can be obtained;

In step 403, Fourier transform is performed on the first circular runout values to obtain second circular runout values after clamping errors are removed from the first simulation hub; the clamping errors refer to errors caused by inaccurate positioning in clamping;

In step 404, statistics on the second circular runout values are collected to obtain first data of fluctuation of the circular runout values of the first simulation hub in both the radial direction and the axial direction; specifically, the fluctuation is a sine curve, the specific analysis method is a runoff harmonic analysis method, which is a common method for analyzing circular runout of a motor vehicle hub, details are not described herein, and reference may be made to the paper "Research on Calibration Method for Aluminum Alloy Hub Runout Tester" in the Journal "Engineering and Testing" in 2013 Issue 04;

In step 405, a second simulation hub meeting a preset requirement is clamped to the first runout tester, and circular runout of preset portions of the second simulation hub in a radial direction and an axial direction is measured respectively, where at least 64 points are measured in each direction to obtain one circular runout value; the difference between the sizes of the second simulation hub and the first simulation hub is greater than a preset value;

In step 406, the second simulation hub is repeatedly clamped three times to obtain three circular runout values, that is, third circular runout values;

In step 407, Fourier transform is performed on the third circular runout values to obtain fourth circular runout values after clamping errors are removed from the second simulation hub;

In step 408, preset statistical processing is performed on the fourth circular runout values to obtain second data of fluctuation of the circular runout values of the second simulation hub in the radial direction and the axial direction. Similar to step 404, the second data also reflects the fluctuation of circular runout of the simulation hub, and is a sine curve; here, the measurements after multiple times of clamping can verify the measurement accuracy of the first runout tester, and can also verify the clamping reliability of the first runout tester.

Through the above method, the simulation hub can accurately verify the runout tester, has a simple structure and a long service life, and is not confused with an ordinary motor vehicle hub.

The foregoing descriptions are merely preferred embodiments of the present disclosure, but are not intended to limit the protection scope of the present disclosure. Any modifications, equivalent substitutions, improvements and the like made within the spirit and principle of the present disclosure shall fall within the protection scope of the present disclosure.

The invention claimed is:

1. A simulation hub, comprising an end plate, a clamping portion and a measuring disc, wherein the clamping portion and the measuring disc are both detachably fixed to the end plate; the clamping portion comprises a first positioning hole for positioning and clamping, the first positioning hole is a cylindrical hole; an outer circumference of the measuring disc comprises at least a measuring cylindrical surface having a bus parallel to an axis of the first positioning hole; and an outer diameter of the measuring cylindrical surface is adapted to an inner diameter of the first positioning hole, a radial distance between an axis of the measuring cylindrical surface and the axis of the first positioning hole is 1 to 2 mm.

2. The simulation hub according to claim 1, wherein numbers of the clamping portion and the measuring disc are respectively at least two, and inner diameters of first positioning holes of clamping portions are different, and are set to gradually increase from small to large; and outer diameters of measuring cylindrical surfaces of measuring discs are set to gradually increase from small to large, and are all adapted to the inner diameters of the first positioning holes.

3. The simulation hub according to claim 2, wherein the measuring disc further comprises a measuring vertical surface which is arranged on an outer side of the measuring cylindrical surface and is at angle of 80 to 90 degrees with the measuring cylindrical surface.

4. The simulation hub according to claim 3, wherein the clamping portion further comprises an end face positioning surface, the end face positioning surface is at one end of the clamping portion, and an angle of 2 to 5 degrees is formed between the end face positioning surface and a vertical plane of the axis of the first positioning hole.

5. The simulation hub according to claim 1, wherein the clamping portion further comprises a boss assembled with the end plate, the end plate comprises a second positioning hole matching the boss.

6. The simulation hub according to claim 1, wherein the measuring disc is further provided with at least two third positioning holes and at least two first connecting holes, the end plate further comprises fourth positioning holes and second connecting holes, with positions of fourth positioning holes and second connecting holes matching the third positioning holes and the first connecting holes, and the measuring disc and the end plate are fixed as follows: positioning pins are respectively inserted into the third positioning holes and the fourth positioning holes for positioning, and then bolts pass through the first connecting holes and the second connecting holes and screwed to nuts for fixing.

7. The simulation hub according to claim 1, wherein the end plate is provided with at least two lightening holes uniformly distributed along a circumference.

* * * * *